(12) United States Patent
Lau

(10) Patent No.: US 8,893,978 B2
(45) Date of Patent: Nov. 25, 2014

(54) SURFACE IDENTIFICATION SYSTEM AND METHOD, OBJECT HAVING AN IDENTIFICATION CODE PATTERN, AND CODE READING APPARATUS FOR READING THE OBJECT

(76) Inventor: Ping Cheung Michael Lau, Hong Kong (CN)

(*) Notice: Subject to any disclaimer, the term of this patent is extended or adjusted under 35 U.S.C. 154(b) by 30 days.

(21) Appl. No.: 13/047,073

(22) Filed: Mar. 14, 2011

(65) Prior Publication Data

US 2012/0234905 A1    Sep. 20, 2012

(51) Int. Cl.
G06K 19/06     (2006.01)
G06K 19/063    (2006.01)
G06K 7/14      (2006.01)
G06K 1/20      (2006.01)
G06K 5/00      (2006.01)

(52) U.S. Cl.
CPC ........ G06K 19/063 (2013.01); G06K 19/06159 (2013.01); G06K 7/1408 (2013.01); G06K 1/20 (2013.01); G06K 5/00 (2013.01)
USPC .......................................................... 235/494

(58) Field of Classification Search
USPC .......................................................... 235/494
See application file for complete search history.

(56) References Cited

U.S. PATENT DOCUMENTS

| | | | | |
|---|---|---|---|---|
| 4,729,564 A | * | 3/1988 | Kuna et al. | 463/9 |
| 5,268,566 A | * | 12/1993 | Wakaumi et al. | 235/493 |
| 5,451,178 A | * | 9/1995 | Yorozu et al. | 446/175 |
| 5,700,998 A | * | 12/1997 | Palti | 235/375 |
| 7,102,798 B2 | * | 9/2006 | Haines et al. | 358/471 |
| 7,108,184 B2 | * | 9/2006 | Mase et al. | 235/462.01 |
| 8,241,084 B2 | * | 8/2012 | Todokoro | 446/175 |
| 2007/0241177 A1 | * | 10/2007 | Tuschel et al. | 235/375 |
| 2011/0042452 A1 | * | 2/2011 | Cormack | 235/375 |

* cited by examiner

Primary Examiner — Christle I Marshall
(74) Attorney, Agent, or Firm — Rabin & Berdo, P.C.

(57) ABSTRACT

The present invention provides A surface identification system comprising: at least one identification code pattern comprising a plurality of recesses, through holes and/or projections formed on an code area of a first surface, the identification code pattern being made to correspond to the first surface or a second surface; and a code reading apparatus for reading the identification code pattern, the code reading apparatus being capable of irradiating light rays towards the code area, receiving reflected light rays reflected from the code area to read out the identification code pattern according to an amount of the reflected light rays from each of the plurality of recesses, through holes and/or projections, and indicating a correspondence between the identification code pattern and the first surface or the second surface. The invention also relates to a surface identification method, an object having an identification code pattern and a code reading apparatus for reading the object.

20 Claims, 11 Drawing Sheets

Game Flow Chart for word game

SURFACE IDENTIFICATION SYSTEM AND METHOD, OBJECT HAVING AN IDENTIFICATION CODE PATTERN, AND CODE READING APPARATUS FOR READING THE OBJECT

FIELD OF THE INVENTION

This invention relates generally to a system and a method for identification of a surface, and more particularly, to a system and a method for identification of a surface by reading an identification code pattern formed on the surface through light modulation induced by the identification code pattern. This invention also relates to an object having the identification code pattern and a code reading apparatus for reading the object.

BACKGROUND OF THE INVENTION

In industrial and/or consumer product applications, some electronic means are required to detect different faces on a three dimensional object for the purposes of identification and/or automating sorting, for example to identify the 2 faces of a tile, or to identify the 6 individual faces on a cube and etc. RFID (Radio Frequency Identification) technology can be used to identify the different faces of the object. In the RFID method, RFID data chip with different ID codes can be put onto the underside of each face of the 6 faces on a cube, such that a RFID reader/decoder can be used to read and to decode the RFID data chip on each of the faces. Alternatively, bar code labels, each with a different bar code, can be applied to a surface, and a bar code scanner can be used to read the bar code applied on this surface for identification.

Use of the RFID method requires a separate RFID data chip for each surface of the object, therefore the cost for using the RFID technology is relatively high. In addition the data chip needs a mechanical assembly process in order to be placed onto each of the faces, therefore errors can be introduced during the assembly process. For example, the data chip can be put wrong onto an incorrect surface, not to mention the extra labor cost for the mechanical assembly.

Similarly, in the case of the bar code label technology, it is necessary to apply a bar code label onto a surface. Again this requires an additional assembly process which can add costs and is possible to introduce errors, not to mention other problems such as a case that the bar code label is relatively easily torn off from a surface, making the identification to be a failure.

Moreover, a bar code is an optical machine-readable representation of data, which shows data of the object to which it attaches. Generally the bar code represents data by varying the widths and spacing of parallel lines in black and white. When the bar code is printed on a surface of an object, it is less aesthetic.

Therefore there is a need for providing a new technology for the identification of a surface, which can reduce the costs and avoid the errors to increase the precision of reading the code.

SUMMARY OF THE INVENTION

The present invention has been developed to fulfill the needs noted above and therefore has a principle object of the provision of a three-dimensional identification code pattern which is not easy to be torn off and can be made colorful.

Another object of the invention is to provide an identification code pattern which affords additional structural and operating advantages.

These and other objects and advantages of the invention are satisfied by providing a surface identification system comprising:

at least one identification code pattern comprising a plurality of recesses, through holes and/or projections formed on an code area of a first surface, the identification code pattern being made to correspond to the first surface or a second surface; and a code reading apparatus for reading the identification code pattern, the code reading apparatus being capable of irradiating light rays towards the code area, receiving reflected light rays reflected from the code area to read out the identification code pattern according to an amount of the reflected light rays from each of the plurality of recesses, through holes and/or projections, and indicating a correspondence between the identification code pattern and the first surface or the second surface.

The recesses, through holes and/or projections are preferably of rectangular configuration and arranged in parallel from one another.

In one embodiment of the invention, the identification code pattern is for the identification of information regarding characteristics of the surface according to a coding algorithm. The information is selected from the group consisting of material, color, direction, figure, number and text.

In general, the code area is positioned on an edge of the first surface.

The light rays can be selected from the group consisting of infrared light, red light, white light and/or blue light.

An infrared photo coupler may be used as the code reading apparatus.

Each of the plurality of recesses, through holes and/or projections represents a binary code "1" or "0". The identification code pattern includes a starting bit and an ending bit.

A second aspect of the invention relates to a method for identifying a surface, comprising:

providing an identification code pattern on a code area of a first surface, the identification code pattern comprising a plurality of recesses, through holes and/or projections formed on the code area;

irradiating light rays towards the code area, so that a portion of light rays are reflected therefrom;

receiving the reflected light rays to read out the identification code pattern according to an amount of the reflected light rays from each of the plurality of recesses, through holes and/or projections; and indicating a correspondence between the identification code pattern and the first surface or a second surface.

A third aspect of the invention relates to an object having at least one surface comprising a code area on which at least one identification code pattern comprising a plurality of recesses, through holes and/or projections is formed, wherein the identification code pattern is made to correspond to the at least one surface.

A fourth aspect of the invention relates to a code reading apparatus for reading an identification code pattern of the object, comprising:

a housing;
a power supply;
a circuitry electrically connected to the power supply;
means for irradiating light rays and for detecting an amount of reflected light rays, the means being operatively connected to the circuitry;

at least one channel mounted on the housing for guiding movement of the object so that the code area is scanned by the irradiating and detecting means;

at least one holder coupled to the at least one channel for accommodating the object;

wherein the irradiating and detecting means is capable of irradiating light rays towards the code area, receiving and detecting reflected light rays reflected from the code area, transmitting a signal to the circuitry for further processing, so as to read out the identification code pattern indicative of a correspondence to a surface, according to an amount of the reflected light rays from each of the plurality of recesses, through holes and/or projections.

In one embodiment of the invention, the irradiating and detecting means is an infrared photo coupler.

The code reading apparatus is provided with a cover on the housing. The power supply is a battery and/or an appropriate AC-DC power supply.

The present invention provides an alternative solution and technology for the detection and/or identification of a surface and/or different faces on a three dimensional object by modulating the light reflection, for instance infrared reflection directly from a surface by means of a three-dimensional identification code pattern on the surface, such that an inexpensive IR reader/decoder can be used to read and decode the code pattern in order to identify the surface and/or the different faces on the object, without the need of installing additional electronic circuit and/or further surface treatment, such as printing and/or labeling to a surface for that purpose.

According to the present invention, the code pattern is embedded onto a surface of an object when the object is formed or manufactured, therefore it helps to minimize and/or eliminate the need for any addition of parts and/or assembly, which not only lowers the production costs, more importantly it can eliminate any errors during the assembly as mentioned above for the other solutions. Unlike the bar code method which typically requires printing the bar code/codes in black and white, the present invention can virtually take on any color.

The present invention provides a technical solution which effects an amplitude and/or frequency modulation to the light reflection from a surface by means of an embedded code pattern on that surface. The code pattern can be read and decoded using for example a simple infrared reader/decoder for the purpose of identification, sorting or the similar.

To have a better understanding of the invention reference is made to the following detailed description of the invention and embodiments thereof in conjunction with the accompanying drawings.

DETAILED DESCRIPTION OF THE PREFERRED EMBODIMENTS

While this invention is illustrated and described in preferred embodiments, the invention may be produced in many different configurations, sizes, forms and materials.

When a light source is pointed at a surface, be it a metallic and/or a plastic surface, a portion of the light will be reflected from the surface. The amount of light reflection depends on the physical properties of the surface. Generally, a matt or darker colored surface reflects less light while a glossy and/or lighter colored surface reflects more light. If a light-receiving sensor such as a photo transistor and/or photo diode is brought close to the surface while a light source is irradiating light onto it, the light receiving sensor can receive the light reflected from the surface. The amount of light received by the light receiving sensor is basically in proportion to the distance between the sensor and the reflective surface and to the light reflective property of the surface such as color and glossiness.

As long as the sensor is not in direct contact with the surface and consequently blocks out all the reflection from reaching the sensor, or the light sensor is too far apart from the surface such that there is too little or no light to reach the sensor to cause a response, a portion of light reflection will occur when the light is irradiated towards the surface.

It is known in the art that a brighter color such as white and yellow reflects more light than darker color such as dark blue and purple, a high gloss finished surface reflects more light than a matt finished surface.

Figure 1A:
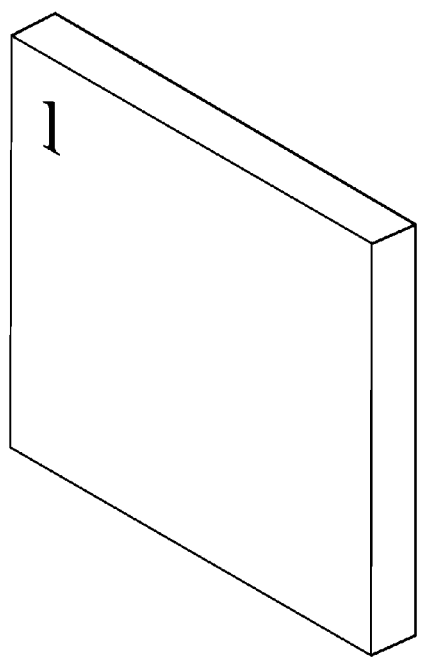
FIG. 1A shows a smooth flat surface of an object on which an identification code pattern is not formed.
Figure 1B:
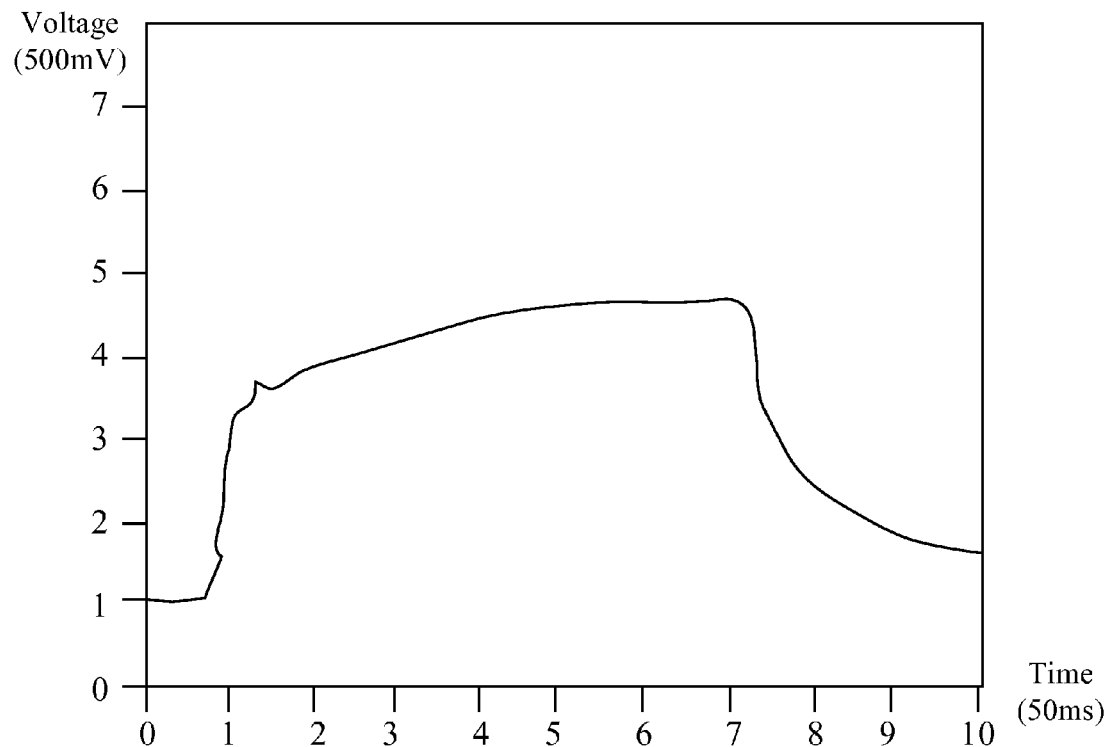
FIG. 1B shows a waveform of an electrical signal when an IR photo coupler is used to electrically scan across the surface of FIG. 1A.

FIG. 1A shows an object of a flat plastic piece about 2 mm thick, the surface 1 of the object is smooth and does not have recess or projections. FIG. 1B shows an electrical signal corresponding to the light reflected from this flat plastic surface, when means for irradiating light rays and for detecting an amount of reflected light rays, for instance an IR photo coupler, is electrically powered and used to emit light and scanned across the plastic surface 1. In FIG. 1B, the vertical axis represents a voltage which is shown in arbitrary unit, in practice, the voltage may be for example in the level of 500 mV; and the horizontal axis represents a time when the light travels across the surface 1 of the object, which is also expressed in arbitrary unit and may be about 10-20 ms. FIG. 1B shows that, when the IR photo coupler is brought close to and scanned across the plastic surface, light is reflected from the surface causing a positive going pulse at the output of the IR photo coupler. In FIG. 1B, the voltage signal of the smooth surface may be deemed as a constant value of binary "1" or binary "0".

Figure 2A:
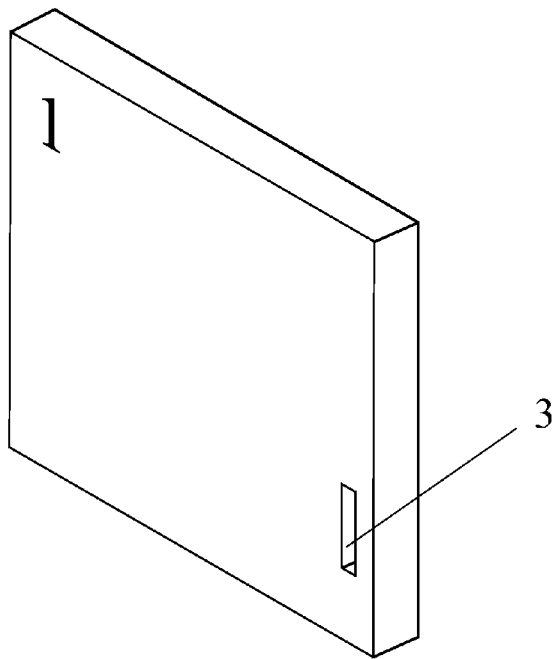
FIG. 2A shows a surface of FIG. 1A having a rectangular slot.
Figure 2B:
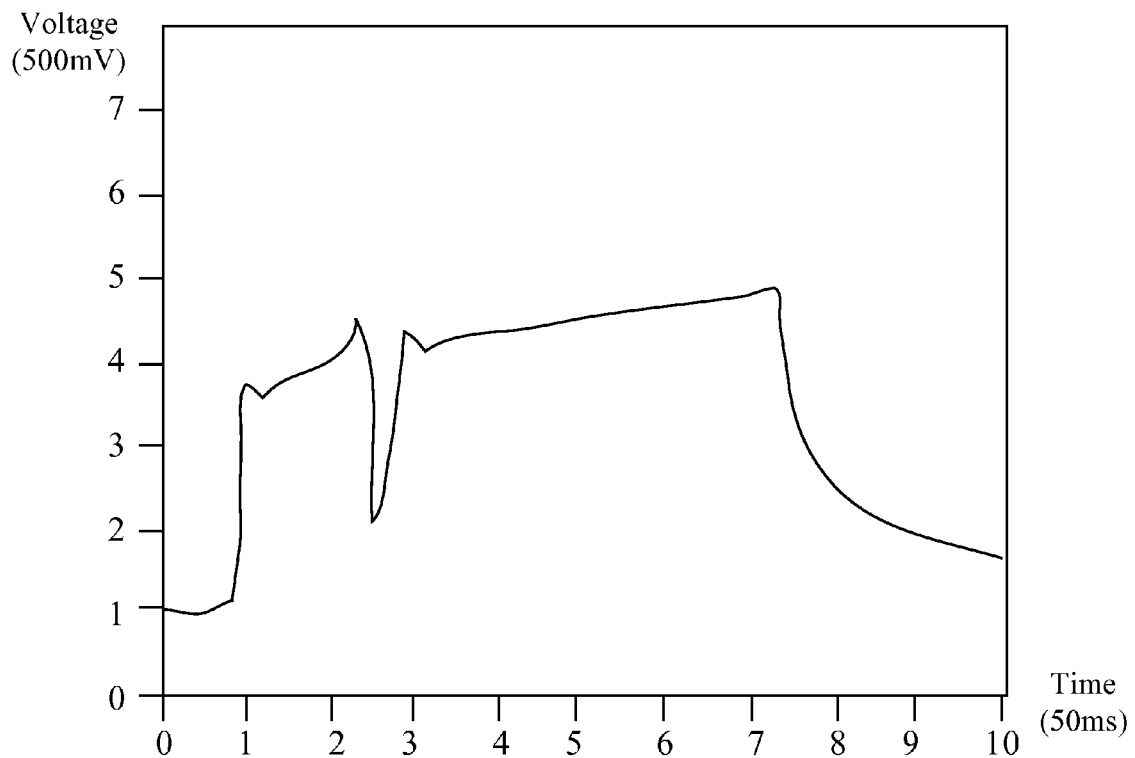
FIG. 2B shows a waveform of an electrical signal when an IR photo coupler is used to electrically scan across the surface of FIG. 2A.

Because the amount of light reflected from a surface depends on the distance between the surface and the sensor apart from the surface properties such as glossiness and colors, in a case that a through hole 3, for example a rectangular through hole, is cut through the surface 1 of the aforementioned object (see FIG. 2A), there is no surface at the through hole 3 to reflect light, therefore the through hole 3 will reflect little or no light. So when an IR photo coupler is brought close to and scanned across this surface with the through hole, the through hole 3 on the surface 1 will cause an amplitude modulation to the electrical signal of the IR reflection as shown in FIG. 2B. That is, the through hole 3 causes the voltage signal of the smooth surface having a depression which may be deemed as a value of binary "0" or vice versa.

Figure 3A:
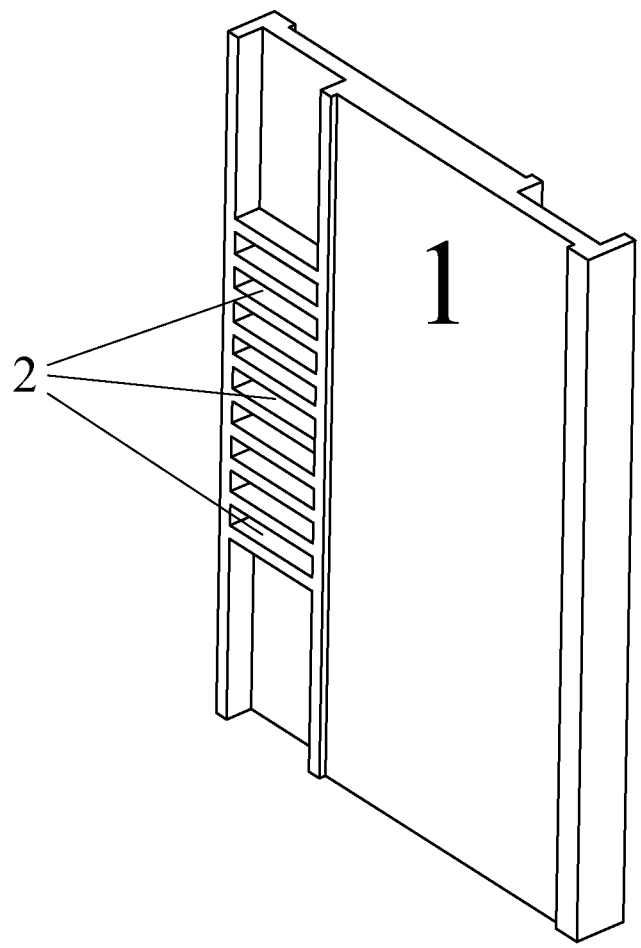
FIG. 3A shows a surface of a block on which an identification code pattern is formed according to one embodiment of the present invention.
Figure 3B:
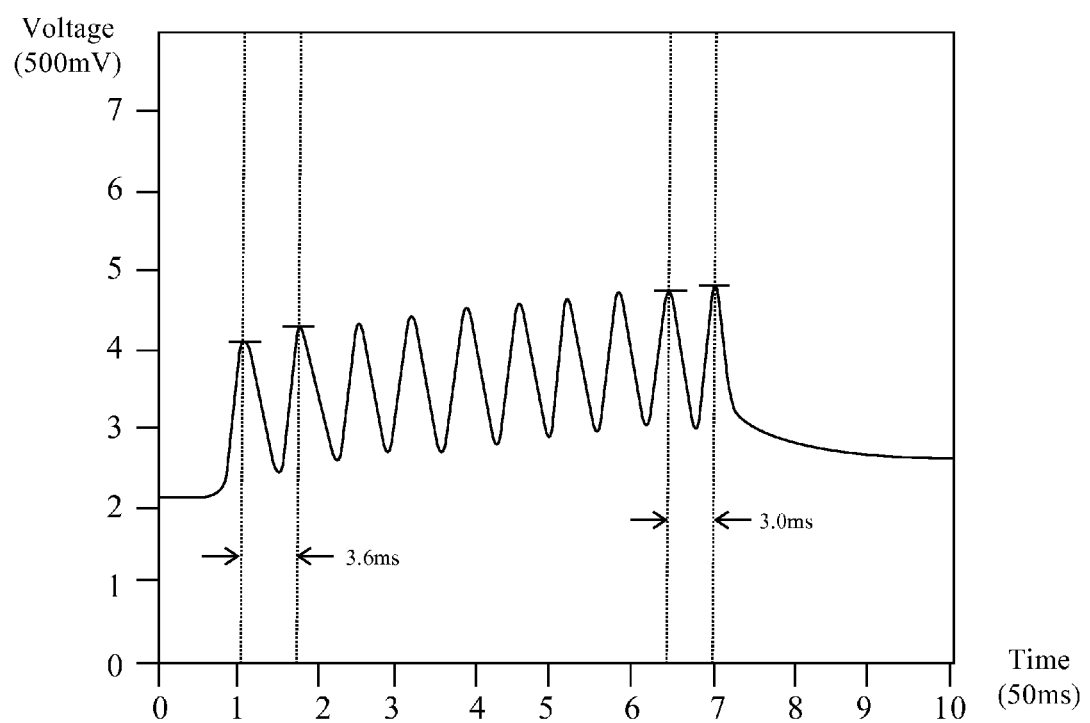
FIG. 3B shows a waveform of electrical signals when an IR photo coupler is used to electrically scan across the surface of FIG. 3A, in which the time difference between the first two electrical pulses and the time difference between the last two electrical pulses are shown.

Since it may not be aesthetically desirable to open up one or more through holes onto a surface in some applications, alternatively a projection (or hump) and/or a recessed slot can be introduced onto the surface (see FIG. 3A). When an IR photocoupler is brought close to and scanned across this surface 1 with a hump and/or recessed slot 2, the hump and/or recessed slot 2 on the surface 1 can effectively modulate the reflective distance between the surface and the sensor. As to the recessed slot 2, the flat surface is closer to the sensor therefore it reflects more light while the recessed slot 2 reflects less light due to an increase in the reflective distance from the surface and hence to the sensor. Consequently such a change in the reflective distance on a surface due to the introduction of the recessed slot will cause a modulation in the IR photo coupler output as shown in FIG. 3B. This is applicable to the case of the projection formed on the surface.

Using the above modulation in light reflection by means of the introduction of the through hole 3 and/or recessed slot 2 on the surface 1, a three-dimensional code pattern can be formed on that surface for the purpose of encoding the surface for the purpose of identification and/or similar applications.

For example, a 10 bit digital code pattern constituted of 10 slots of same dimension in rectangular shape can be formed on the surface 1 of an object. In this embodiment, the object is a plastic card of FIG. 3A, each slot 2 represents one bit and will cause a depression in the waveform as shown in FIG. 3B when an IR photo coupler is scanned across the code area of the code pattern. It can be observed in the waveform shown in FIG. 3B that, due to inertia and acceleration in the scanning action, the pitch between the continuous electrical pulses varies in time, indicating a frequency modulation apart from the amplitude modulation in the waveform. As illustrated, the pitch between the first two continuous electrical pulses is 3.6 millisecond, and the pitch between the last two continuous electrical pulses is 3.0 millisecond. Namely, the time difference between the two continuous electrical pulses would be reduced slowly from left to right in FIG. 3B. This information can be used to determine the speed of a scan if so desired.

Figure 4:
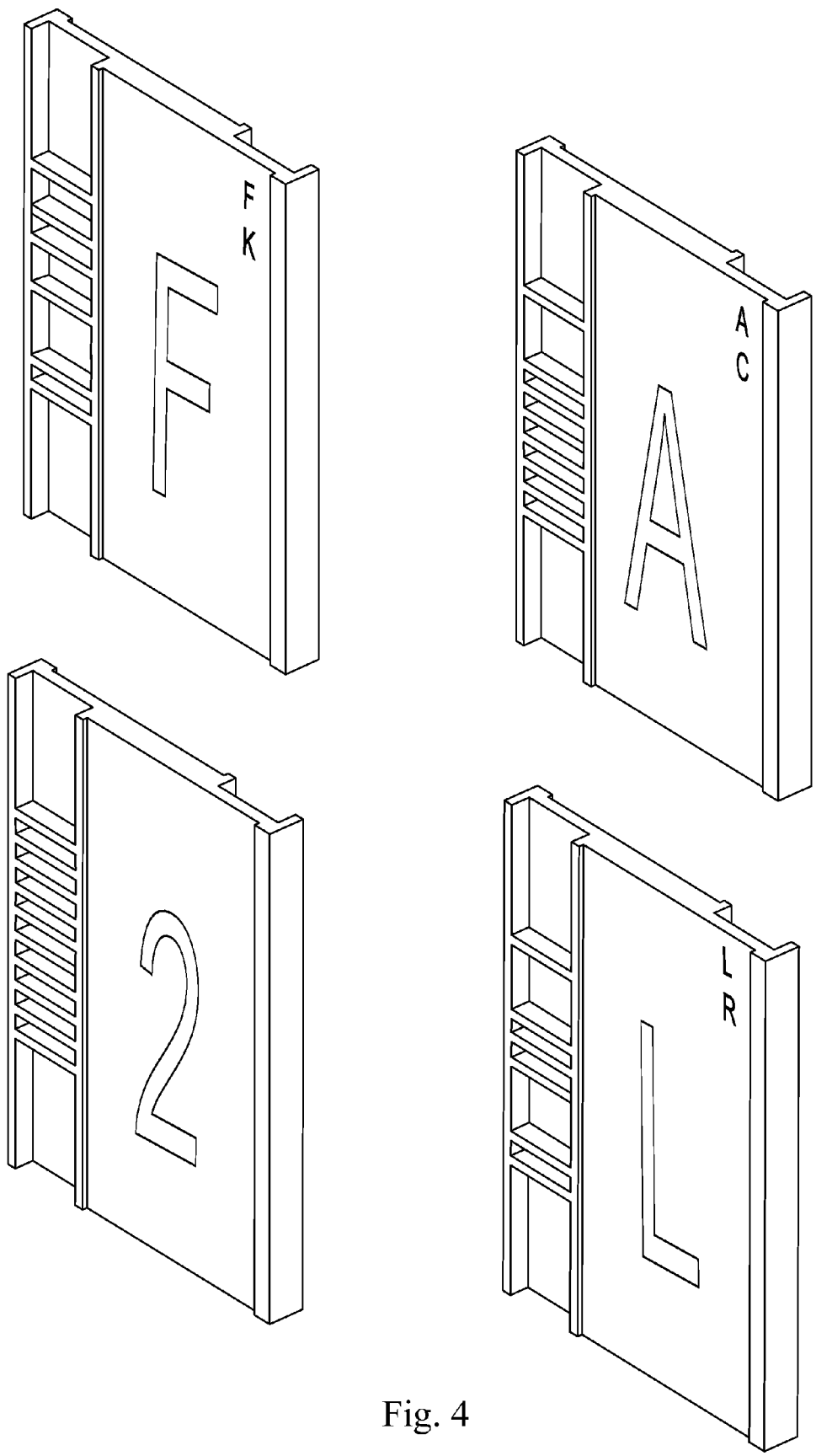
FIG. 4 shows some examples of identification code pattern according to the present invention.
Figure 7A:
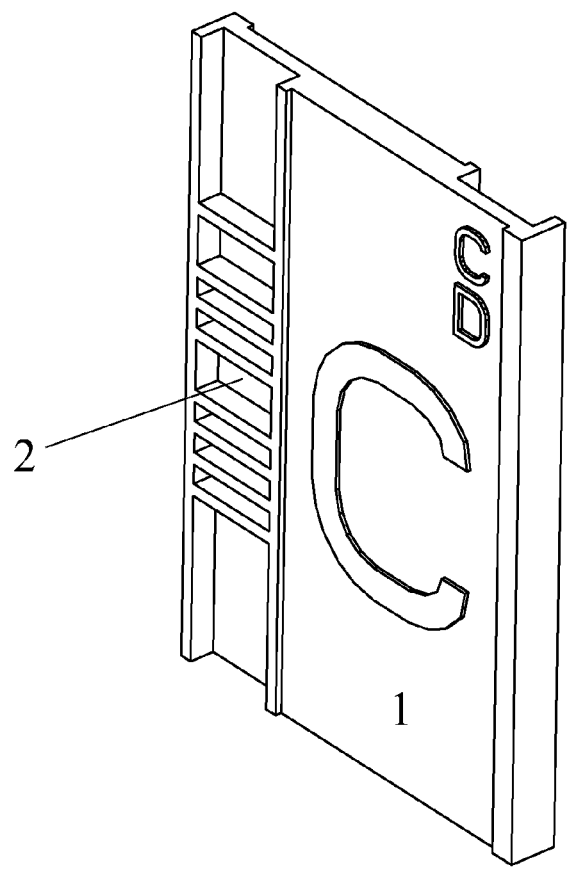
FIG. 7A shows a perspective view of one surface of a play card on which an identification code pattern is formed in the code area and a letter "C" is molded.
Figure 7B:
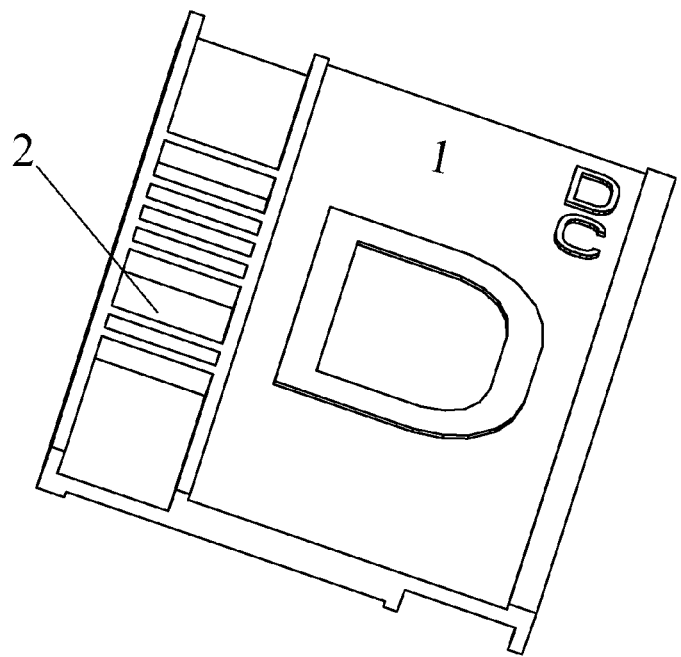
FIG. 7B shows a perspective view of the other surface of the play card of FIG. 7A, on which another identification code pattern is formed in the code area and a letter "D" is molded.

In yet another embodiment, such plastic card/play card may already contain alphabetic letters and/or numbers marked on its surface. The identification code pattern can be included on the alphanumeric cards to facilitate the use of an electronic reader to electronically identify the individual alphabet and/or number on a card. FIG. 4 shows some injection molded plastic alphanumeric cards with the respective 10 bit identification code patterns for the respective alphabet and/or number on the cards. Unlike the conventional printed bar codes, the 10 bit code patterns are formed when the cards are injection molded, therefore there is no need for any addition of any parts and/or assembly process to form the code patterns. Using a 10 bit code for the embedded identification code pattern, a total of 1024 code patterns can be generated. FIGS. 7A and 7B show a plastic play card, on top and bottom surfaces of which are molded with the letters "C" and "D" and the corresponding embedded 10 bit identification code patterns, respectively. It should be noted that the code pattern on the "C" surface may be made to correspond to the "C" surface itself or to the "D" surface, if desirable.

Referring to FIGS. 7A and 7B, the identification code pattern formed by the slots 2 or projections is arranged on an edge of the surface 1 and represents the letter or number on the opposite surface rather than on the surface of this code pattern, facilitating the reading of the code pattern by a card reader. This will be described hereinbelow.

The following is to show a product application for an interactive video word game using the above described identification code pattern with direct surface light reflection modulation.

A video word game may display a picture or a video clip of an animal or an object on a display device such as a TV. Typically the video word game may include an alphanumeric keyboard as a user interface device to allow the user to enter the words and/or numbers to interact in a game. Using the identification code pattern formed on a surface of the invention, an alternative user interface device can be developed. For example, the alphanumeric plastic cards as shown in FIG. 4 can be used as an input means instead of using a conventional "qwerty" keyboard to input and/or to spell a word in a game.

Figure 5:
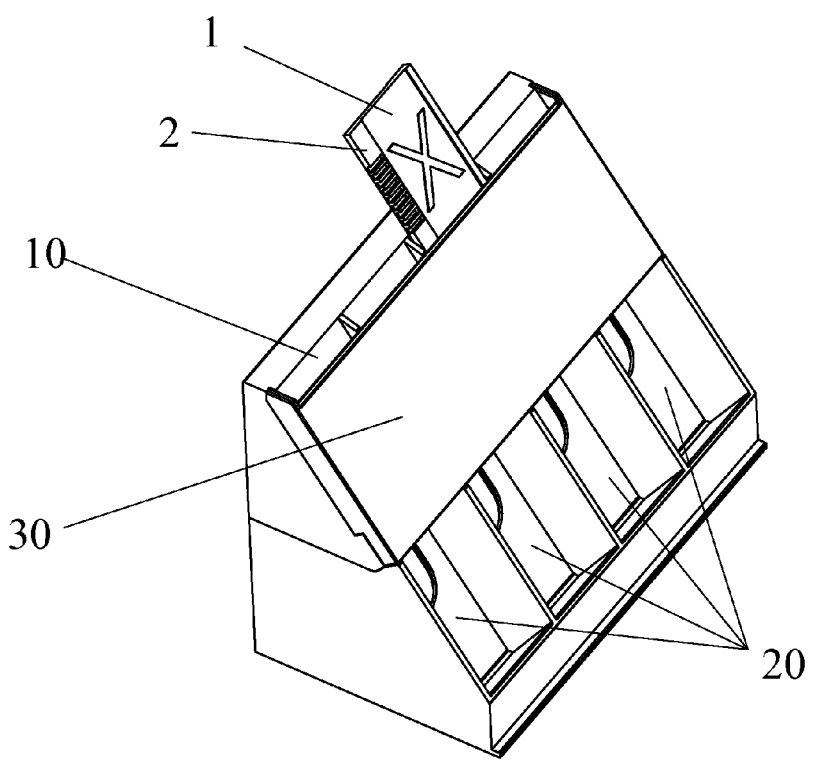
FIG. 5 shows a perspective view of a card reader constructed according to the present invention.
Figure 6:
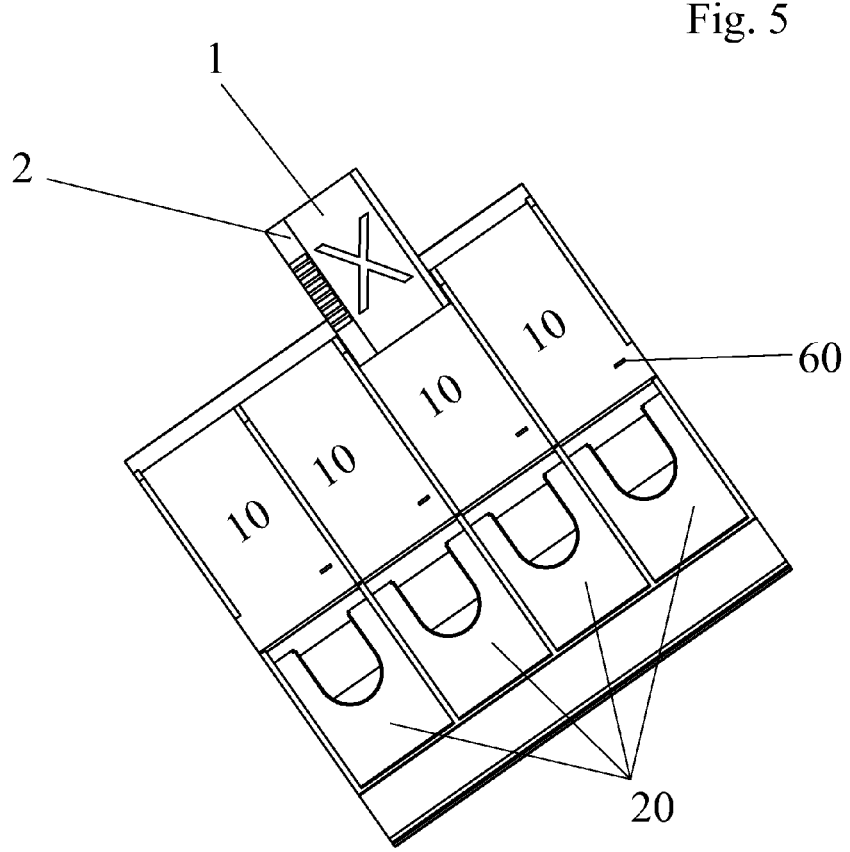
FIG. 6 shows a front elevation view of the card reader of FIG. 5.

FIG. 5 and FIG. 6 illustrate a card reader for reading the alphanumeric plastic cards of FIG. 4, which is used in a word game. FIG. 7A and FIG. 7B are typical drawings of the alphanumeric plastic play cards with an identification code pattern to work in conjunction with the card reader. The principle and electronic circuit design for the multimedia interactive video word game for use with the plastic card reader of the invention can be made reference to the conventional technology in the art, which are not the essence of the invention and therefore not discussed in detail herein.

The alphanumeric plastic play cards of FIG. 7A and FIG. 7B may have the respective embedded code patterns to represent the corresponding alphabets and/or numbers on the plastic cards. The code patterns are constituted of the plurality of recessed slots 2 on the surface 1. To minimize the costs, both the top and bottom side surfaces of each plastic card can be made to include an alphabet and/or number with the corresponding code pattern respectively. The following Table 1 shows an example of the binary code assignment for each of the alphabetic plastic cards from A to Z and numeric blocks from 0 to 9. Preferably, the code pattern comprises two slots or projections representing a start bit and an ending bit of the code respectively. It should be noted that the code patterns may have different meanings upon actual applications.

TABLE 1

| Character | Code |
|---|---|
| A | 0000000001 |
| B | 0000000010 |
| C | 0000000011 |
| D | 0000000100 |
| E | 0000000101 |
| F | 0000000110 |
| G | 0000000111 |
| H | 0000001000 |
| I | 0000001001 |
| J | 0000001010 |
| K | 0000001011 |
| L | 0000001100 |
| M | 0000001101 |
| N | 0000001110 |
| O | 0000100000 |
| P | 0000100001 |
| Q | 0000100010 |
| R | 0000100011 |
| S | 0000100100 |
| T | 0000100101 |
| U | 0000100110 |
| V | 0000100111 |
| W | 0000101000 |
| X | 0000101001 |
| Y | 0000101010 |
| Z | 0000101011 |
| 1 | 0000101100 |
| 2 | 0000101101 |
| 3 | 0000101110 |
| 4 | 0000110000 |
| 5 | 0000110001 |
| 6 | 0000110010 |
| 7 | 0000110011 |
| 8 | 0000110100 |
| 9 | 0000110101 |
| 0 | 0000110110 |

FIG. 6 shows the card reader with a cover 30 for the card channel being removed. As illustrated, a narrow opening 60 is provided on the right and lower part of each of the four card channels on the card reader, behind the narrow opening 60 is mounted a IR photo coupler. The narrow opening 60 is needed in order for the IR photo coupler to effectively read the IR reflection from the identification code pattern as it passes through the IR photo coupler. A typical width for this opening is slightly narrower than the width of a reflective surface of the slot or projection constituting the code pattern. For example, the typical width of a reflective surface of the slot or projection of the code pattern on the plastic play card is about 1 mm, then the opening for allowing the IR photo coupler on the card reader to read the code pattern can be about 0.8 mm. In normal use, the —IR photo coupler is hidden behind the card channel cover 30 so as to shield off any potential light interference from the environment from affecting the IR photo coupler.

Figure 8:
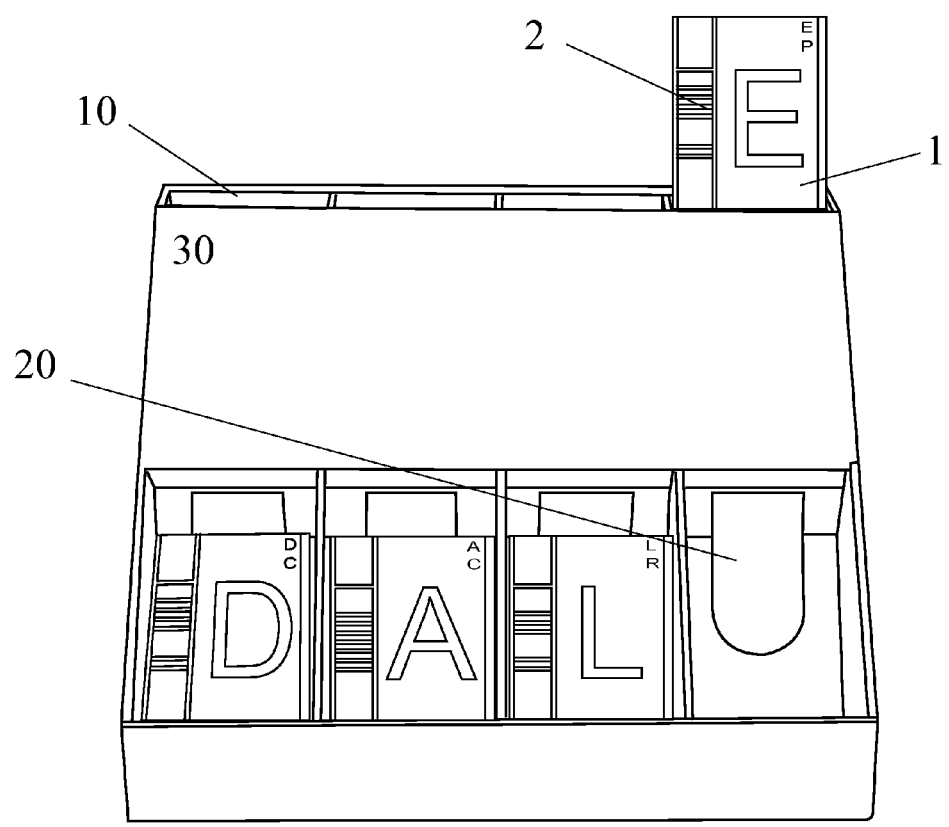
FIG. 8 shows a front view of a card reader according to the present invention, which has four channels allowing for reading four play cards.

There are 4 card channels 10 in the card reader, each card channel having its own IR photo coupler in this illustrative card reader design. Referring to FIG. 8, to spell the word "DALE", a player finds the plastic cards for D, A, L, and E respectively and drops them one by one into the card channels in sequence. As illustrated a card is rested in its own card holder 20 after it drops through the card channel 10 and can be removed at any time by the player.

In this embodiment, the identification code pattern embedded on the bottom surface of the card is corresponding to the letter molded on the top surface, because the code area of the bottom surface is scanned across the IR photo coupler, while the letter on the top surface is visible, when the card is travelling through the card channel 30 and rests in the card holder 20 after the travelling. Likewise, the identification code pattern embedded on the top surface of the card is corresponding to the letter molded on the bottom surface. Such an arrangement is in compliance with the design of the card reader.

Figure 9A:
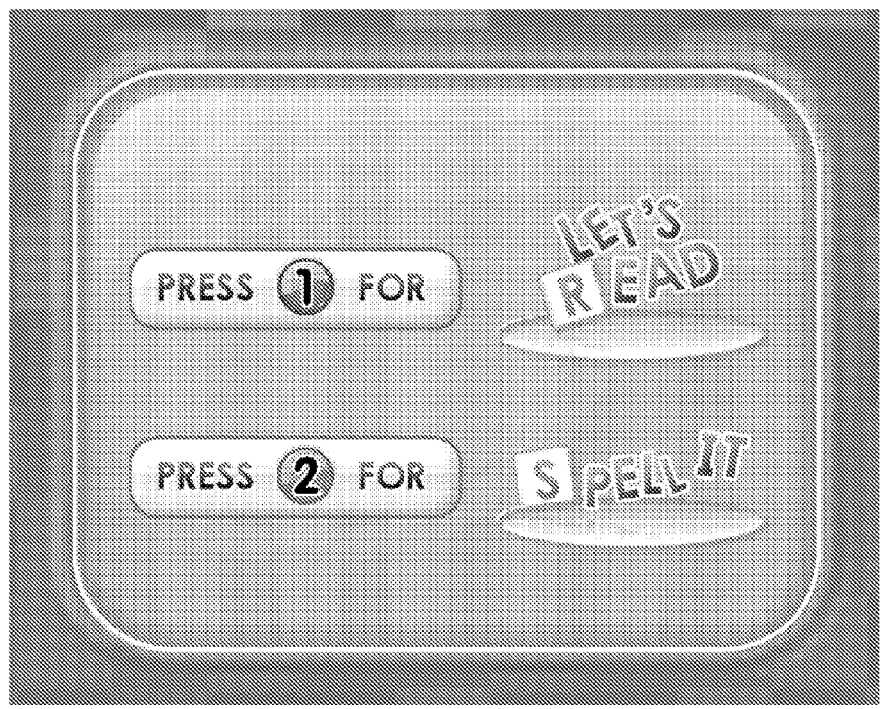
FIG. 9A shows an interface of a game displayed in a screen which is executed in association with the play card and the card reader according to the present invention.
Figure 9B:
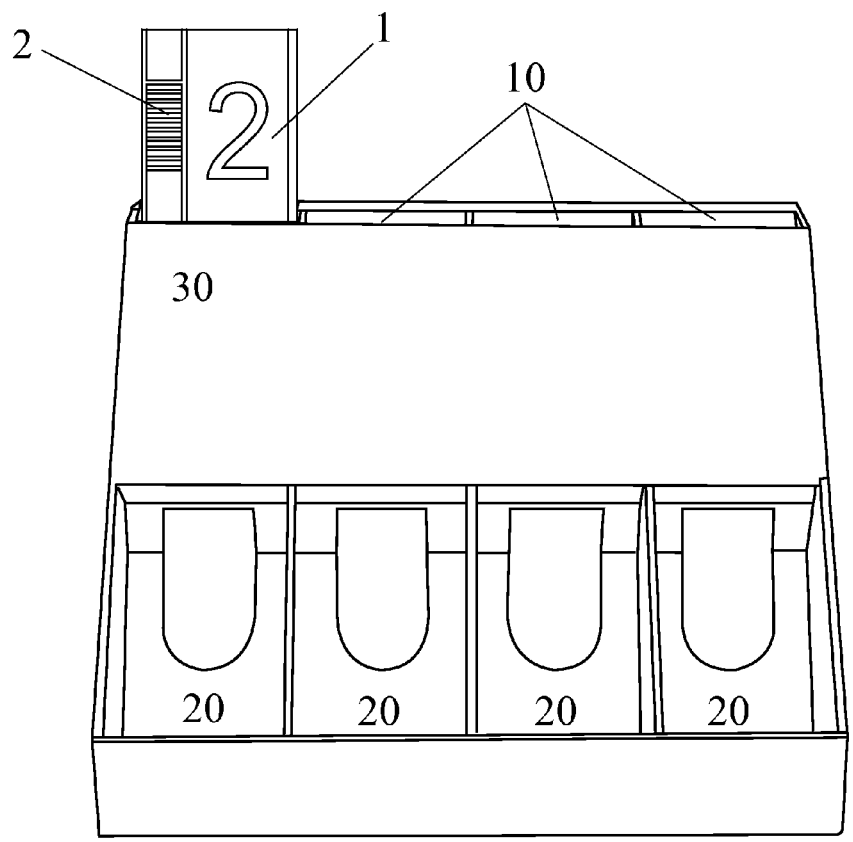
FIG. 9B shows an example of the card reader according to the present invention, wherein one play card is ready to be inserted into the channel of the card reader.

The plastic card reader which houses the electronic circuit can have video and audio output jacks for connection to a video display unit, such as a TV. When the plastic card reader is powered and turned on after being connected to a TV, a game menu is displayed on the TV as shown in FIG. 9A. In this embodiment, the menu offers 2 game options, a user can choose one option from 2 different games, namely game 1 and game 2. To choose a particular game to play, the user inserts a number card corresponding to the number displayed on the TV for that game. For example if the user wants to play game 2, the user must find the number 2 numeric card and drops it into the card channel 10 on the card reader as shown in FIG. 9B. As the numeric card drops down and through the card channel 10 on the card reader by means of gravitational force, the card passes through an IR photo coupler located in the card channel; the identification code pattern formed on the card can effect an amplitude modulation to the IR reflection and can be read by the IR photo coupler through the narrow opening 60 to produce an electric code signal.

Figure 10A:
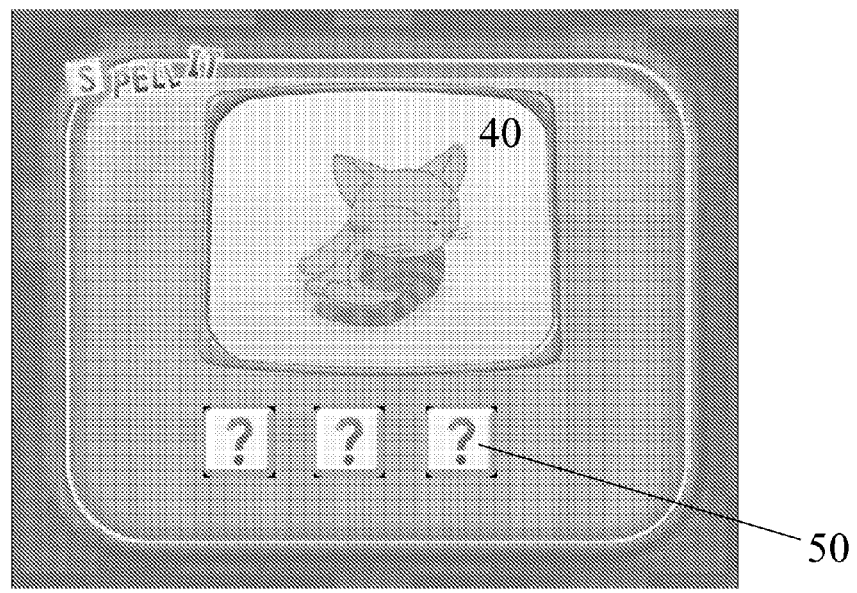
FIG. 10A shows a second interface of a game displayed in a screen which is executed in association with the play card and the card reader according to the present invention.
Figure 10B:
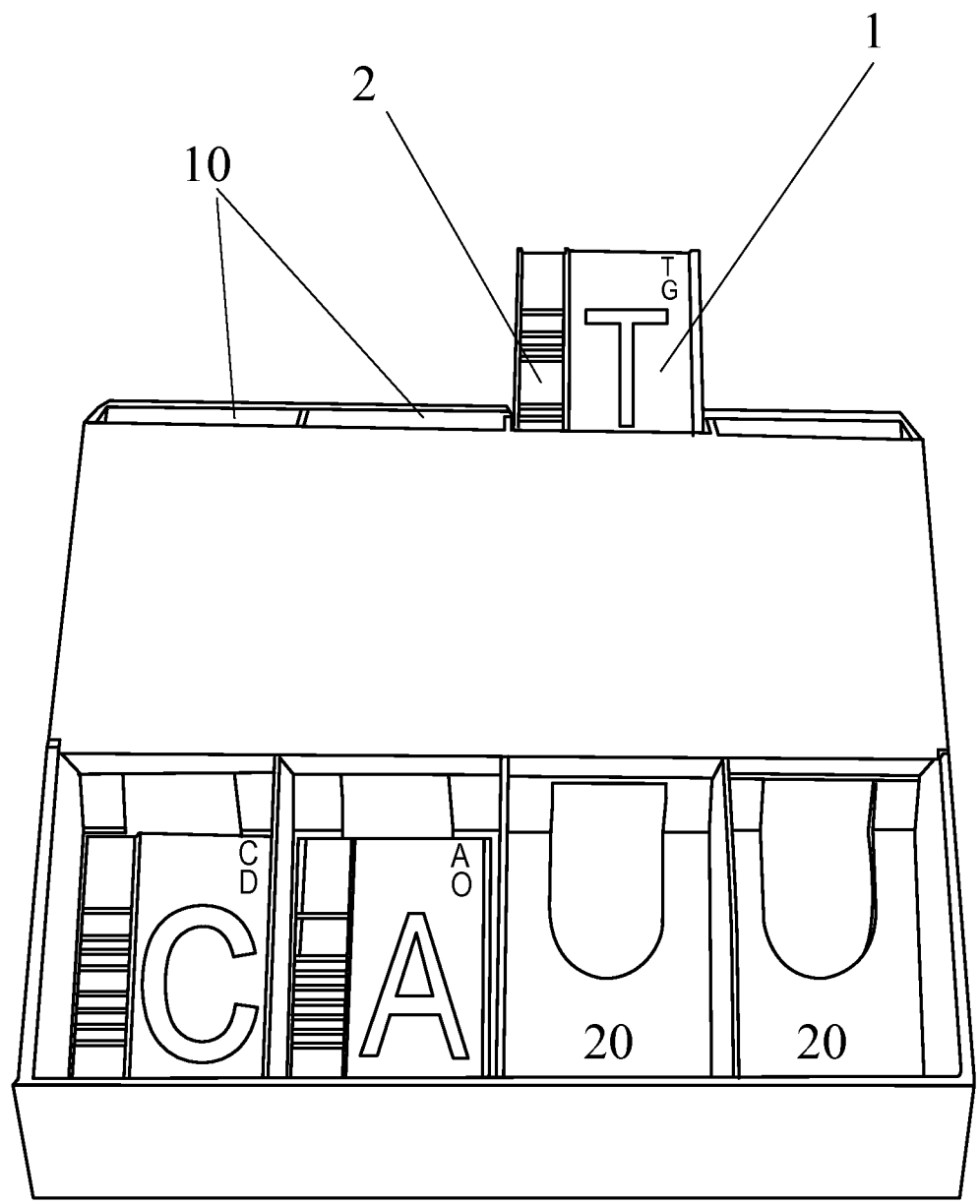
FIG. 10B shows a card reader according to the present invention, wherein two play cards are received in the holder of the card reader, and one play card is ready to be inserted into the channel of the card reader.

The code signal from the IR photo coupler is fed through a simple Analog/Digital converter in the electronic circuit and the code signal is then fed into the electronic circuit in the card reader for processing. Upon receipt of the code signal, the electronic circuit would check to see if the code is a valid code or not. If it is a valid code, in this case, the code represents the player chooses Game 2, the electronic circuit will initiate the game play for game 2 and display the game contents for the player to play accordingly. For example the game unit can show a picture or a video clip of a cat and then asks the player to spell the word for this animal as illustrated in FIG. 10A. The player needs to find the alphabetic cards and drop them through the respective card channels on the game unit, as shown in FIG. 10B. The card reader in the game unit can read and identify the identification code patterns on the cards and determine if the player spells the word correctly or not. It can then provide the video and/or audio feedback to interact with the player.

Figure 11:
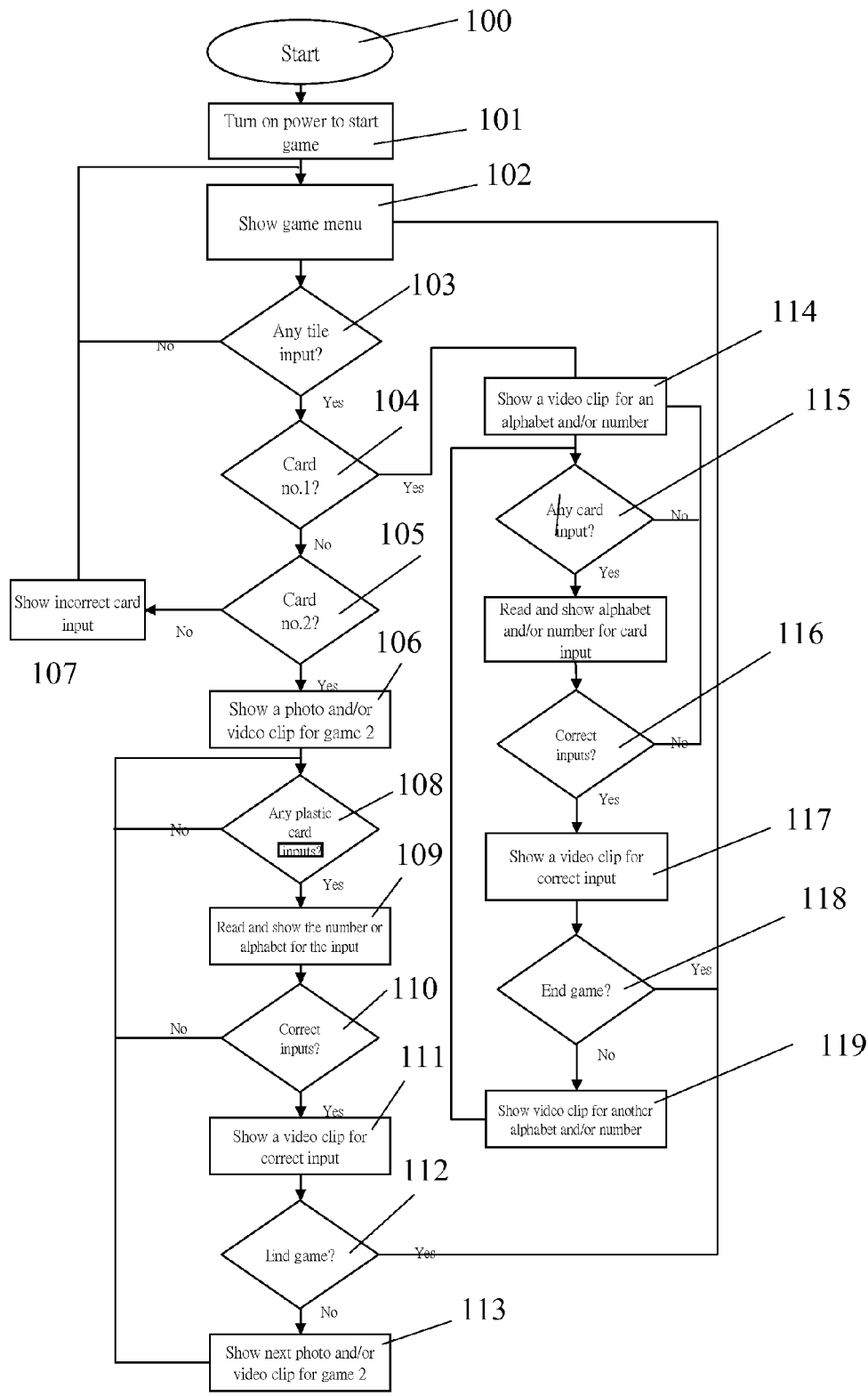
FIG. 11 is a flow chart of a word game shown in FIG. 9A or 10A.

FIG. 11 is a flow chart for such a video word game. In step 100, the game starts. The user turns on the power to start the game in step 101. The display shows the game menu or interface in step 102. The card reader detects if any tile (i.e. the plastic card having an identification code pattern according to the present invention) is inserted into the card input slot in step 103. If no card is inserted, the game goes to step 102. If a card is inserted, the card reader detects if the card is Card No. 1 in step 104.

If the card detected in step 104 is Card No. 1, the game goes to step 114, the display will show a video clip for an alphabet and/or number. The card reader detects if any card is inputted in step 115. If no card is inserted, the game goes to step 114. If a card is inserted, the card reader reads the card, and the display shows the alphabet or number for the card in step 116. Then the game checks if the card inserted is correct in step 117. If the card is not correct, then the game goes to step 114. If the card is correct, the game shows a video clip for the correct input in step 118. Then the game asks if the user wants to end the game in step 119, if yes, the game goes to step 102; if no, the game goes to step 120 to show a video clip for another alphabet and/or number in step 120 and then go to step 115.

If the card detected in step 104 is not Card No. 1, the game goes to step 105 to check if the card inserted is Card No. 2. If not, the game goes to step 107 and shows "Incorrect Card Input". If yes, the game goes to step 106 to show a photo and/or a video clip for game 2. Then the card reader detects if any plastic card according to the present invention is inserted in step 108. If no card is inserted, the card reader repeats to detect in step 108. If a card is detected, the game goes to step 109, in which the card reader reads the card, and the display shows the alphabet or number for the card. Then the game checks if the card inputted is correct in step 110. If the card is not correct, then the game goes to step 108. If the card is correct, the game shows a video clip for the correct input in step 111. Then the game asks if the user wants to end the game in step 112, if yes, the game goes to step 102; if no, the game goes to step 113 to prepare to show a video clip for another alphabet and/or number and then go to step 108.

According to the invention, the method for reading an identification code pattern formed on a surface of an object such as a plastic card comprises the steps of: providing an identification code pattern on a code area of a first surface, the identification code pattern comprising a plurality of recesses, through holes and/or projections formed on the code area; irradiating light rays towards the code area, so that a portion of light rays are reflected therefrom; receiving the reflected light rays to read out the identification code pattern according to an amount of the reflected light rays from each of the plurality of recesses, through holes and/or projections; and indicating a correspondence between the identification code pattern and the first surface or a second surface.

From the foregoing, it can be seen that there has been provided a new technology for identifying a surface with reduced errors and less labor intensity. While the embodiments described herein are intended as exemplary surface identification systems and apparatus associated, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A surface identification system comprising:
    at least one identification code pattern comprising a plurality of through holes, recesses, or projections, or any combination thereof, formed on a code area of a first surface, the identification code pattern being made to correspond to the first surface or a second surface; and
    a code reading apparatus for reading the identification code pattern, the code reading apparatus being capable of irradiating light rays towards the code area, receiving reflected light rays reflected from the code area to read out the identification code pattern according to modulation to an electrical signal of the reflected light rays from each of the plurality of through holes, recesses, or projections, or any combination thereof, and indicating a correspondence between the identification code pattern and the first surface or the second surface;
    wherein the modulation is caused by a combined effect of a reflective distance between the code reading apparatus and each of the plurality of through holes, recesses, or projections, or any combination thereof, and surface properties of each of the plurality of through holes, recesses, or projections, or any combination thereof.

2. A surface identification system as claimed in claim 1, wherein the through holes, recesses, or projections, or any combination thereof are of rectangular configuration and arranged in parallel from one another.

3. A surface identification system as claimed in claim 1, wherein the identification code pattern is for the identification of information regarding characteristics of the surface.

4. A surface identification system as claimed in claim 3, wherein the information is selected from the group consisting of material, color, direction, figure, number and text.

5. A surface identification system as claimed in claim 3, wherein the information is identified according to a coding algorithm.

6. A surface identification system as claimed in claim 1, wherein the code area is positioned on an edge of the first surface.

7. A surface identification system as claimed in claim 1, wherein the code reading apparatus is an infrared photo coupler.

8. A surface identification system as claimed in claim 1, wherein each of the plurality of through holes, recesses, or projections, or any combination thereof represents a binary code "1" or "0".

9. A surface identification system as claimed in claim 1, wherein the identification code pattern includes a starting bit and an ending bit.

10. A method for identifying a surface, comprising:
    providing an identification code pattern on a code area of a first surface, the identification code pattern comprising a plurality of through holes, recesses, or projections, or any combination thereof, formed on the code area;
    irradiating light rays towards the code area, so that a portion of light rays are reflected therefrom;
    receiving the reflected light rays to read out the identification code pattern according to a modulation of an electrical signal of the reflected light rays from each of the plurality of through holes, recesses, or projections, or any combination thereof, wherein the modulation is caused by a combined effect of a reflective distance between a surface where the reflected light rays are received and each of the plurality of through holes, recesses, or projections, or any combination thereof, and surface properties of each of the plurality of through holes, recesses, or projections, or any combination thereof; and
    indicating a correspondence between the identification code pattern and the first surface or a second surface.

11. A method as claimed in claim 10, wherein the through holes, recesses, or projections, or any combination thereof are of rectangular configuration and arranged in parallel from one another.

12. A method as claimed in claim 10, wherein the identification code pattern is for the identification of information regarding characteristics of the surface.

13. A method as claimed in claim 12, wherein the information is selected from the group consisting of material, color, direction, figure, number and text.

14. A method as claimed in claim 12, wherein the information is identified according to a coding algorithm.

15. A method as claimed in claim 10, wherein the code area is positioned on an edge of the first surface.

16. A method as claimed in claim 10, wherein the light rays are infrared rays.

17. A method as claimed in claim 10, wherein each of the plurality of through holes, recesses, or projections, or any combination thereof represents a binary code "1" or "0".

18. A code reading apparatus for reading an identification code pattern of an object having at least one surface comprising a code area on which at least one identification code pattern comprising a plurality of through holes, recesses, or projections, or any combination thereof, is formed, wherein the identification code pattern is made to correspond to the at least one surface, comprising:
- a housing;
- a power supply;
- a circuitry electrically connected to the power supply;
- means for irradiating light rays and for detecting an amount of reflected light rays, the means being operatively connected to the circuitry;
- at least one channel mounted on the housing for guiding movement of the object so that the area code is scanned by the irradiating and detecting means;
- at least one holder coupled to the at least one channel for accommodating the object;
- wherein the irradiating and detecting means is capable of irradiating light rays towards the code area, receiving and detecting reflected light rays reflected from the code area, transmitting a signal to the circuitry for further processing, so as to read out the identification code pattern indicative of a correspondence to a surface, according to a modulation to an electrical signal of the reflected light rays from each of the plurality of through holes, recesses, or projections, or any combination thereof; and
- wherein the modulation is caused by a combined effect of a reflective distance between the code reading means and each of the plurality of through holes, recesses, or projections, or any combination thereof, and surface properties of each of the plurality of through holes, recesses, or projections, or any combination thereof.

19. A code reading apparatus as claimed in claim 18, wherein the irradiating and detecting means is an infrared photo coupler.

20. A code reading apparatus as claimed in claim 18, wherein the code reading apparatus is provided with a cover on the housing.

* * * * *